Jan. 5, 1954  J. DEAN  2,664,991
TRAVELLING SUPPORTS FOR HANK DRYING MACHINES
Filed July 26, 1951  2 Sheets-Sheet 1

Inventor:
Joseph Dean
By Cushman Darby & Cushman
Attorneys

Jan. 5, 1954 J. DEAN 2,664,991
TRAVELLING SUPPORTS FOR HANK DRYING MACHINES
Filed July 26, 1951 2 Sheets-Sheet 2
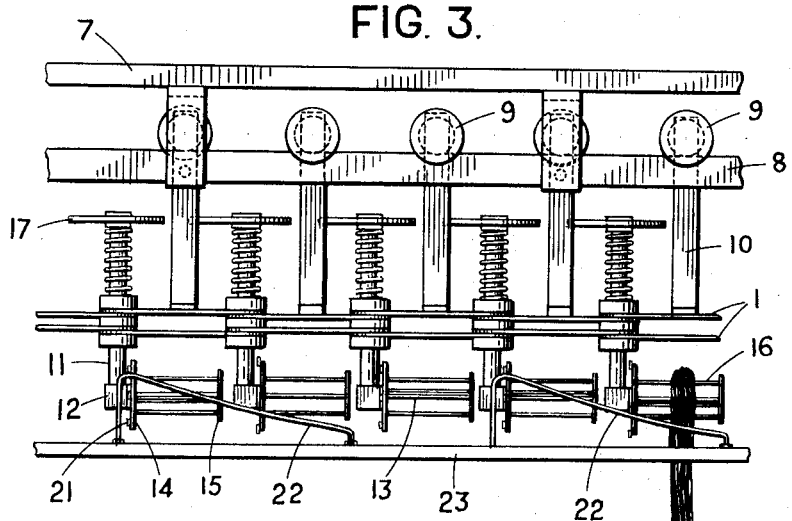
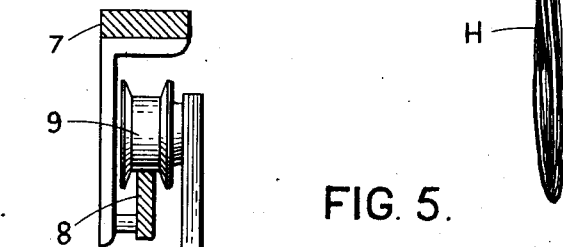
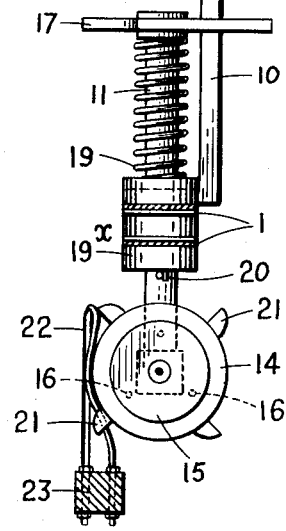
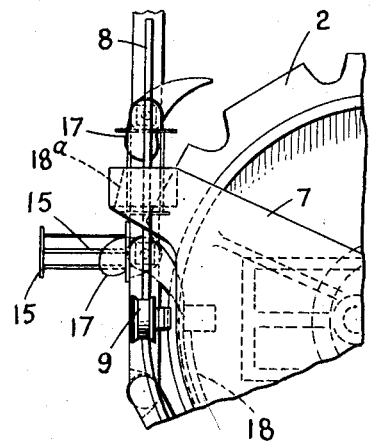

Patented Jan. 5, 1954

2,664,991

UNITED STATES PATENT OFFICE 2,664,991

TRAVELING SUPPORT FOR HANK DRYING MACHINES

Joseph Dean, Harrogate, England

Application July 26, 1951, Serial No. 238,643

7 Claims. (Cl. 198—33)

This invention relates to travelling supports for carrying hank or ropes of yarn or other textile or like materials through a drying machine. In such a machine the hanks or the like are carried through the drying compartment by a flexible carrier such as an endless chain passing around chain wheels, the hank supports being carried out of the drying compartment to permit unloading of dried hanks and loading of moist ones.

One object of the invention is to enable such hanks or the like to be supported during their travel through the dryer so that they are dried uniformly and are not liable to have damp patches where they have rested on the supports.

A further object is to provide a support which can be moved into different positions during its travel so as to shift the points of support of the hank or the like and allow the whole of the hank to be fully exposed to the hot air or other drying medium.

A still further object is to enable the supports for the hank or the like to be moved in relation to the travelling chain or the like which carries them so as to present the supports in the best direction for loading and unloading the hanks and then turning said supports to present the hanks in the best direction for drying.

According to the invention the support for the hank or the like comprises a skeleton or spider form of spool or reel having two or more arms or hooks on which the hank can be hung, connections by which it can be moved bodily through the dryer by the travelling chain or the like, and devices on said spool or reel for automatically turning it periodically during its travel through the dryer.

Such spool or reel may comprise three horizontal arms mounted between end plates which are freely rotatable in a bearing mounted on a support arm attached to the travelling chain or the like and the spool or reel can have projections adapted to engage co-acting surfaces on the dryer to cause the periodical rotation of the spool or reel.

Furthermore, the spool or reel can be so mounted from the travelling chain or the like as to be capable of being moved in an approximately horizontal plane by connections adapted to engage co-acting parts on the dryer so as to turn it from the drying position to the loading and unloading position and if desired vice versa.

With the above and other objects in view the invention further consists in the improved construction and arrangement of parts which will be more particularly described in connection with the embodiment illustrated in the accompanying drawings, wherein:

Figure 3 is an elevation of a portion of the endless chain and its associated parts showing it passing through the drying chamber of the machine.

Figure 4 is a view on an enlarged scale of one of the hank supports and its associated parts, the view being taken at right angles to that of Figure 3.

Figure 5 is a plan showing a portion of a second chain wheel with means for returning the reels to the drying position.

Figure 1:
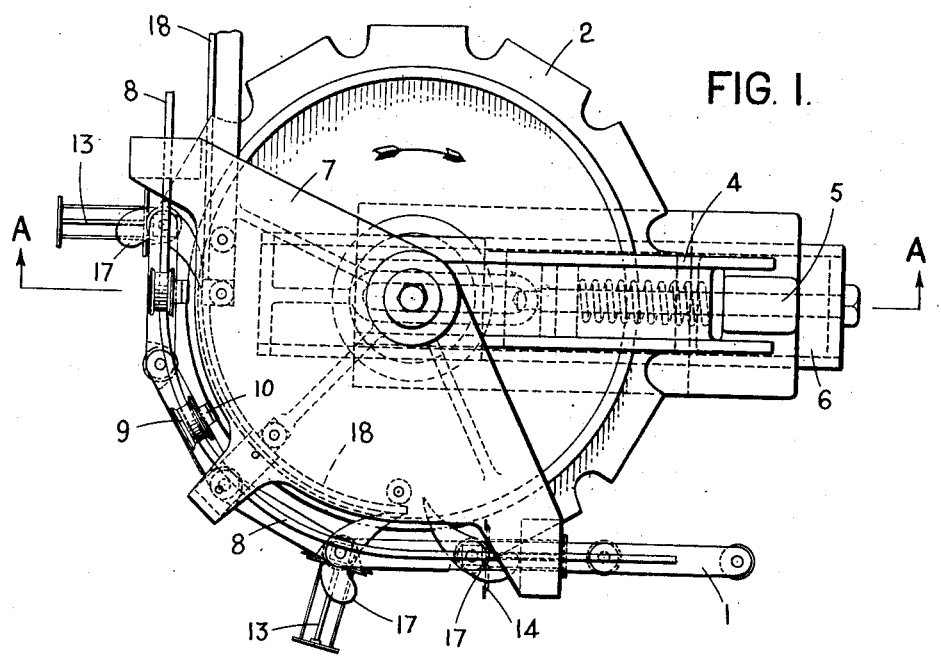
Figure 1 is a plan of a portion of an endless chain showing one of the chain wheels and its mounting and also the hank supports.
Figure 2:
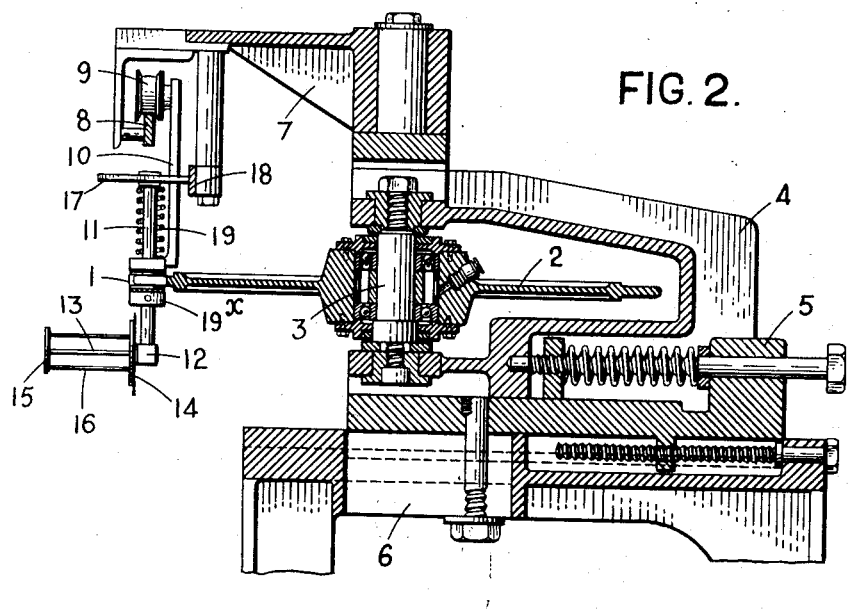
Figure 2 is a sectional elevation taken on the line A—A of Figure 1.

Referring to the drawings, particularly Figures 1 and 2 thereof, there is shown an endless chain 1 passing around a chain wheel 2 which is one of (say) four arranged two at each end of the drying chamber. The wheel 2 is shown as having its spindle 3 mounted in a bracket 4 upon a lower bracket 5 supported from the machine frame 6, so as to be bodily adjustable to vary the chain tension.

An upper segment bracket 7 carried upon the bracket 4 supports a rail 8 which follows the path of the chain 1 and is similarly supported in connection with each chain wheel and at other points where necessary. On this rail run a series of rollers 9 two only being shown in Figure 1, from which depend brackets 10 forming bearings for the rotatable upright spindles 11 of the hank supports. These spindles 11 pass through the joints between adjacent links of the chain 1 so as to be carried around the machine thereby, and their lower ends carry blocks 12 each forming a bearing for the axle of a horizontally arranged skeleton reel 13 which is freely rotatable (three such reels only being shown in Figure 1).

Each reel 13 consists of inner and outer end plates 14, 15, carrying between them arms 16, which may be of stainless steel or other suitable material (three arms being shown), upon which a hank can be hung as shown at H in Figure 3. Such an arrangement ensures that the hanks are kept in an open condition to facilitate the drying action of the air in the drying chamber.

The top of each upright spindle 11 has fixed thereto an actuating lever 17 the nose of which can engage an actuating rail 18 to cause the reel 13 to be turned through approximately 90° about the vertical axis. This rail is located preferably at one end of the machine, and will extend outside the drying chamber over the distance required for unloading and loading the reels, and may be supported as shown from the brackets 7. A compression coil spring 19 surrounds each upright spindle 11 to produce friction between the chain 1 and a collar 19X fixed on the spindle for retaining the reel in any position to which it is moved. After the reels have passed the unloading and loading position they are carried round a second chain wheel 2 (see Figure 5) where the actuating rail 18 ceases and an abutment 18a on the bracket 7 is provided to act on the tails of the actuating levers 17 to return the reels to the drying position.

With the above construction it will be seen that the reels are normally held by the springs 19 so as to lie with their axles in a line with the chain, whereby the hanks whilst being carried through the drying chamber are presented to the drying air so as to give the best drying action. But on emerging from the drying chamber the reels are swung outwards by the actuating rail 18 as shown in Figure 1 so as to facilitate unloading and re-loading, the abutments 18a acting to return them to the drying position as soon as the end of the actuating rail 18 is reached.

Instead of using the abutments 18a to return the reels, this could be done by securing the upper and lower ends of each spring 19 to its actuating lever or spindle and its bracket 10 respectively so that the torsion of the spring turns the reel back after the loading position has been passed.

The effective drying of the hanks is further facilitated by arranging to turn the reels 13 about their axles as they pass through the drying chamber so as to change the points of contact between the hanks and the supporting arms 16 of the reels. As shown in Figures 3 and 4 this is brought about by providing on the inner end plate 14 of each reel a number of lugs 21 and locating within the drying chamber a series of inclined surfaces 22 mounted on a support bar 23, whereby as the reels are carried along successive lugs engage each inclined surface 22 in turn to cause the reels to be progressively rotated.

Thus the hank is supported at several spaced points between which the drying air can pass, and the parts of the hank actually in contact with the reel arms is repeatedly changed to enable efficient and uniform drying to take place.

I claim:

1. In a machine for drying materials carried in hank form on travelling supports which are carried through the machine by a flexible carrier, the combination of a rail extending through the machine, a series of depending brackets each having a roller running on said rail, an upright spindle rotatably supported in each of said brackets, a tractive connection between said bracket and said flexible carrier, a skeleton reel rotatable supported from each of said spindles with the reel axis in a substantially horizontal position, a plurality of arms on each of said reels arranged to support the material in extended condition with the two sides of the hank spaced apart, and means associated with each of said spindles for automatically moving said reel so that its axis projects outwardly from the machine in the loading and unloading portions of its travel, but lies with its arms substantially in line with the flexible carrier whilst passing through the dryer, each of said reels when passing through the machine being moved so that the material carried thereby is positioned in a plane substantially transverse to the direction of travel of the carrier through the machine.

2. In a machine for drying materials carried in hank form on travelling supports which are carried through the machine by a flexible carrier, the combination of a rail extending through the machine, a series of depending brackets each having a roller running on said rail, an upright spindle rotatably supported in each of said brackets, a tractive connection between said bracket and said flexible carrier, a skeleton reel rotatable supported from each of said spindles with the reel axis in a substantially horizontal position, a plurality of arms on each of said reels arranged to support the material in extended condition with the two sides of the hank spaced apart, and means associated with each of said spindles for automatically moving said reel so that its axis projects outwardly from the machine in the loading and unloading portions of its travel but lies with its arms substantially in line with the flexible carrier whilst passing through the dryer, each of said reels when passing through the machine being moved so that the material supported thereon is positioned in a plane transverse to the direction of travel of the carrier said means comprising an actuating rail supported from the machine and an actuating lever connected to said spindle so as to engage said actuating rail and thereby turn said spindle and the reel supported thereby.

3. In a machine for drying materials carried in hank form on travelling supports which are carried through the machine by a flexible carrier, the combination of a rail extending through the machine, a series of depending brackets each having a roller running on said rail, an upright spindle rotatably supported in each of said brackets, a tractive connection between said bracket and said flexible carrier, a skeleton reel rotatable supported from each of said spindles with the reel axis in a substantially horizontal position, a plurality of arms on each of said reels arranged to support the material in extended condition with the opposite sides of the hank spaced from each other, and means associated with each of said spindles for automatically moving said reel so that it projects outwardly from the machine in the loading and unloading portions of its travel but lies with its arms substantially in line with the flexible carrier, whilst passing through the dryer, each of said reels when passing through the machine being moved so that the material supported thereon is positioned in a plane transverse to the direction of travel of the carrier, said means comprising an actuating rail supported from the machine, an actuating lever connected to said spindle so as to engage with its nose said actuating rail and thereby turn said spindle and the reel supported thereby in one direction, and an abutment for engagement by the tail of said actuating lever arranged to return the spindle to its original position when said actuating lever disengages from said actuating rail.

4. In a machine for drying materials carried in hank form on travelling supports which are carried through the machine by a flexible carrier, the combination of a rail extending through the machine, a series of depending brackets each having a roller running on said rail, an upright spindle rotatably supported in each of said brackets, a tractive connection between said bracket and said flexible carrier, a skeleton reel rotatable supported from each of said spindles with the reel axis in a substantially horizontal position, a plurality of arms on each of said reels arranged to support the material in extended condition with the sides of the hank spaced from each other, a series of inclined surfaces within the machine arranged near the path of the travelling reels, projections on the reels for engagement in succession by said surfaces so as to rotate the reels, and means associated with each of said spindles for automatically moving said reel so that it projects outwardly from the machine in the loading and unloading portions of its travel but lies with its arms substantially in line with the flexible carrier whilst passing through the dryer, each of said reels when passing through the machine being moved so that the material carried thereby is positioned in a plane substantially transverse to the direction of travel of the carrier through the machine.

5. In a machine for drying materials carried in hank form on travelling supports which are carried through the machine by an endless chain, the combination of an endless rail extending through the machine, a series of depending brackets slung from rollers running on said rail, an upright spindle rotatably supported in each said bracket and passing through a joint between links of said endless chain, a driven chain wheel engaging said chain, a skeleton reel rotatably supported from the base of each of said spindles with its axis in a substantially horizontal position, a plurality of arms supported between end plates of said reel for supporting the material in extended condition, a series of inclined surfaces within the machine arranged near the path of the travelling reels, a plurality of lugs on the inner end plate of each reel for engagement in succession by said surfaces so as to rotate the reels progressively, an actuating rail supported opposite the unloading and loading positions, an actuating lever connected to the top of each of said spindles so as to engage with its nose said actuating rail and thereby turn said spindle and the reel supported thereby so that the latter projects outwardly from the machine in the loading and unloading portions of its travel, and an abutment for engagement by the tail of said actuating lever arranged to return the spindle to its original position when said actuating lever disengages from said actuating rail so that the arms of the reel lie substantially in line with the chain whilst passing through the machine, each of said reels when passing through the machine being moved so that the material carried thereby is positioned in a plane substantially transverse to the direction of travel of the carrier through the machine.

6. A dryer of the class described including in combination a rail extending through the dryer, a flexible carrier movable through the dryer below the rail, longitudinally spaced depending brackets having rollers at their upper ends movable on said rail, vertically disposed spindles rotatably connected to said brackets, each of said spindles having a reel rotatably connected thereto and extending outwardly and laterally therefrom for carrying hanks of material, each of said reels being movable in substantially a horizontal plane relative to the carrier, said dryer having spaced loading and unloading portions, and means operatively connected to each spindle for rotating the same so as to move the reel in a horizontal plane in order that as the reel passes through the dryer it is moved in longitudinal alignment with adjacent reels so that the material thereon is positioned in a plane transverse to the direction of travel of the carrier and when the reel reaches the loading and unloading positions they are moved outwardly and laterally.

7. A dryer as called for in claim 6 in which means are provided for rotating the reels relative to the carrier as they move through the dryer.

JOSEPH DEAN.

References Cited in the file of this patent

UNITED STATES PATENTS

| Number | Name | Date |
|--------|------|------|
| 581,948 | Sjostrom | May 4, 1897 |
| 1,930,607 | Brown | Oct. 17, 1933 |
| 2,344,476 | Turnbull | Mar. 14, 1944 |